(12) United States Patent
Cooper et al.

(10) Patent No.: US 8,341,445 B2
(45) Date of Patent: *Dec. 25, 2012

(54) POWER MANAGEMENT OF ELECTRONIC DEVICES USING TRANSITIONS BETWEEN LINK STATES BASED ON DEVICE ACTIVITY

(75) Inventors: Barnes Cooper, Tigard, OR (US); Jaya L. Jeyaseelan, Cupertino, CA (US); Robert E. Gough, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/186,322

(22) Filed: Jul. 19, 2011

(65) Prior Publication Data

US 2011/0276816 A1 Nov. 10, 2011

Related U.S. Application Data

(63) Continuation of application No. 11/906,007, filed on Sep. 29, 2007, now Pat. No. 7,984,314.

(60) Provisional application No. 60/930,247, filed on May 14, 2007.

(51) Int. Cl.
*G06F 1/00* (2006.01)

(52) U.S. Cl. ........................................ 713/323; 713/320

(58) Field of Classification Search ................... 713/323, 713/320
See application file for complete search history.

(56) References Cited

U.S. PATENT DOCUMENTS

| | | | |
|---|---|---|---|
| 6,480,476 B1 | 11/2002 | Willars | |
| 7,028,199 B2 | 4/2006 | Ayyavu et al. | |
| 7,136,953 B1 | 11/2006 | Bisson et al. | |
| 7,313,712 B2 | 12/2007 | Cherukuri et al. | |
| 7,984,314 B2 * | 7/2011 | Cooper et al. | 713/323 |
| 2003/0135676 A1 | 7/2003 | Jensen | |
| 2005/0022036 A1 | 1/2005 | Hsu | |
| 2007/0005859 A1 | 1/2007 | Diefenbaugh et al. | |
| 2007/0050653 A1 | 3/2007 | Verdun | |
| 2007/0067548 A1 | 3/2007 | Juenger | |
| 2008/0104422 A1 | 5/2008 | Mullis et al. | |

OTHER PUBLICATIONS

Non-final Office Action for U.S. Appl. No. 11/906,007, Mailed Jul. 15, 2010, 7 pages.

Notice of Allowance for U.S. Appl. No. 11/906,007, Mailed Dec. 3, 2010, 4 pages.

Notice of Allowance for U.S. Appl. No. 11/906,007, Mailed Mar. 11, 2011, 5 pages.

(Continued)

*Primary Examiner* — Chun Cao

(74) *Attorney, Agent, or Firm* — Blakely, Sokoloff, Taylor & Zafman LLP

(57) ABSTRACT

A method and apparatus for intelligent power management for low power link states. Some embodiments include methods, apparatuses, and systems for a device coupled to a controller via a link; a link power management engine to alter a power state of the link based on a transaction and some knowledge of future transactions between the device and the controller; and a memory or logic to store the link power management engine. In some embodiments, the memory stores information about at least one of the following: the power state of the link, the device buffering, the controller or device state or a history of transactions. In some embodiments, the device is a peripheral of a computer system. In some embodiments, the method may include transitioning the device to various link states. Other embodiments are described.

17 Claims, 6 Drawing Sheets

OTHER PUBLICATIONS

"CLKREQ# Dynamic Protocol", PCI-SIG Engineering Change Notice, PCI Express Mini Card, Release 1.0, Feb. 1, 2004.
"PCI Express Base Specification Revision 1.0", PCI-SIG, Jul. 22, 2002.
"PCI Express Base Specification Revision 1.0a", PCI-SIG, Apr. 15, 2003.
"PCI Express Base Specification Revision 1.1", PCI-SIG, Mar. 28, 2005.
"PCI Express Base Specification Revision 2.0", PCI-SIG, Dec. 20, 2006.
"Platform Ref Clock PM Capability", PCI-SIG Engineering Change Notice, PCI Express Base Specification Revision 1.0a, Jan. 12, 2004.
Cooper, Barnes, et al., "Designing Power-Friendly Devices", Microsoft Windows Hardware Engineering Conference (WinHEC) 2007, Intel Corporation, May 8, 2007.

\* cited by examiner

POWER MANAGEMENT OF ELECTRONIC DEVICES USING TRANSITIONS BETWEEN LINK STATES BASED ON DEVICE ACTIVITY

This continuation application is related to, and claims priority to, U.S. Provisional Patent Application Ser. No. 60/930,247, entitled "POWER MANAGEMENT OF LOW POWER LINK STATES" filed on May 14, 2007, and U.S. patent application Ser. No. 11/906,007, entitled "POWER MANAGEMENT OF LOW POWER LINK STATES" filed on Sep. 29, 2007, now issued as U.S. Pat. No. 7,984,314, which are hereby incorporated by reference herein as though set forth in full.

FIELD

Some embodiments of the invention generally relate to link power states of devices. In particular, some embodiments relate to power management of link states.

BACKGROUND

Computer systems commonly are sensitive to the behavior of devices coupled to the systems. Such effects include power management issues. Because power management has typically operated in a cooperative model, one badly behaving device can, by preventing a computer system from transitioning to an appropriate state of reduced power consumption, reduce the effectiveness of any or all platform power management mechanisms.

In one example, power in a computer system may be optimized utilizing low power states. Multiple different states with different levels of operation and power savings may be available. However, a processor of the computer system or any computer subsystem can remain stuck in a higher power state due to, for example, inopportune manner.

Many devices in current computer systems make use of PCI, PCI Express (PCIe), or Universal Serial Bus (USB, USB2) interconnects via on-board integration, integrated Mini-Card devices, ExpressCard slots, and/or USB walk-up ports. These interconnect standards, among others, are not in themselves optimized for power-friendly devices. Because of this, there may be a need for power efficient device design through use of traffic alignment, coalescing interrupts, and providing robust low power link state usage.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figures 1A, 1B:
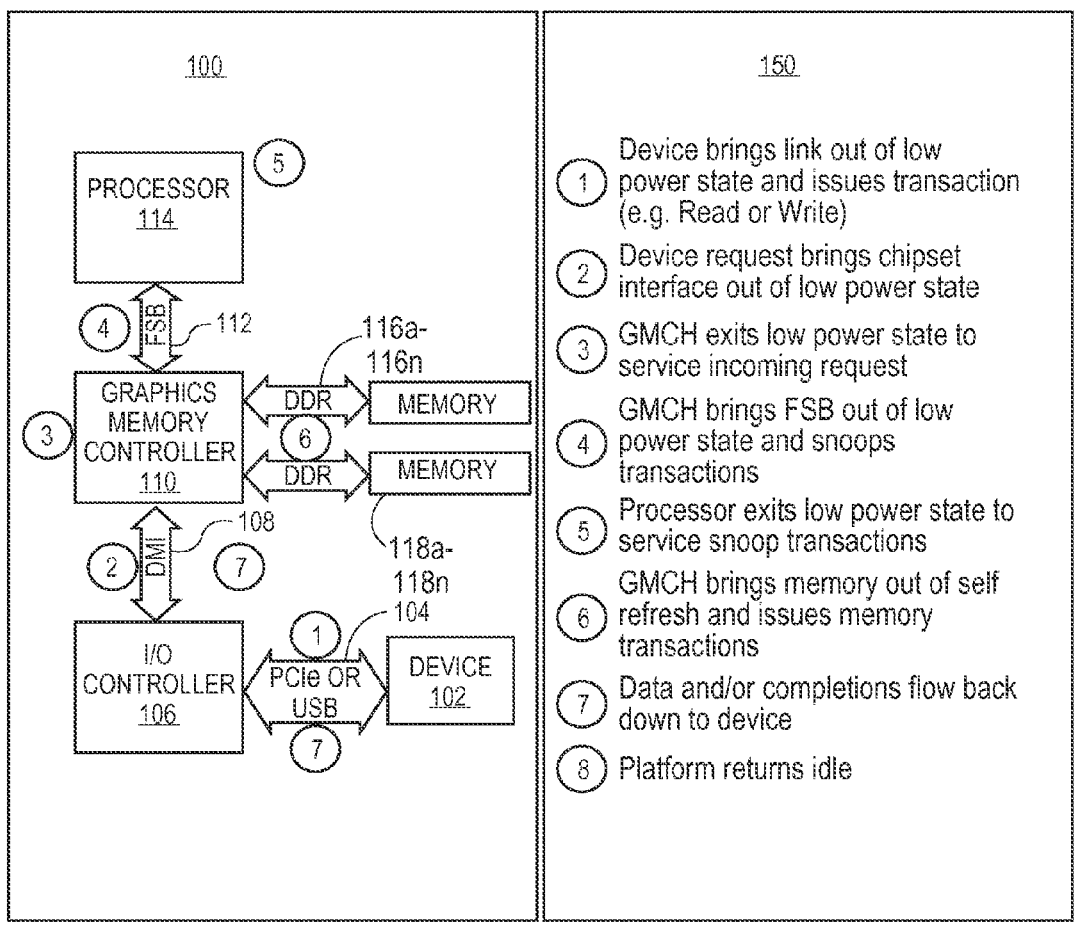
FIGS. 1A and 1B illustrate the transition of a system to higher powered states as data is transferred.

An embodiment of the invention concerns power management of link states.

In some embodiments, a system provides for improved power efficiency with regard to low power link state usage. In some embodiments, a computer system provides for transitions between link states for a device that are related to active traffic usage, rather than only elapsed time. In some embodiments, a link will be prevented from dropping unnecessarily to a lower power state when there is active traffic for a device.

The PCI Express Specification (including PCI Express Base Specification Revision 1.0, Jul. 22, 2002, PCI Special Interest Group, and the subsequent PCI Express Base Specification Revision 2.0, Dec. 20, 2006, PCI Special Interest Group) defines a concept of several link states for a device that is in an active ("D0") state. In this definition, "L0" is the active link state wherein transactions may be in flight. "L0s" is the first stage of idleness for the link, and is known as the "standby" state. In this state, some amount of power is saved by quiescing the link while still maintaining active all relevant circuitry to re-activate the link within a period that is typically less than 100 symbol times. Active State Power Management (ASPM) "L1" is the next level of power savings, and is known as "lower power standby". In L1, the link enters a deeper level of power savings, and the device can optionally power off its internal clock circuit, which may include a PLL (phase lock loop). The PCIe specification also specifies a model for software to programmatically discover the link latency structures from the top of the system hierarchy to the endpoint, and then evaluate whether the path for these latencies exceeds what a device can tolerate, thereby setting the link active state power management policy accordingly on a link-by-link basis.

However, conventional methodology for link power states is insufficient and leads to several key problems for devices in making use of the lower power link states. Specifically:

(1) Devices generally use a timeout-based policy for progression from L0→L0s→L1. Thus, the transition to a lower state is based on a timer, and the link state will transition to the next lower state if sufficient time has elapsed.

(2) In many computer systems, especially mobile platforms, that include key power management features such as deep C4, C5, and C6, the latency for issuance of a transaction on a given endpoint link, continuing until the transaction completes in memory and is potentially also snooped on the FSB (front side bus—carrying data between the central processing unit and the north bridge), can be much larger than the maximum tolerable exit latency as computed through walking the link structure. The maximum tolerable exit latency may be expected to be about 55 μs in some computer systems, including, but not limited to, Intel® Core 2 Duo Mobile Platforms.

(3) The PCIe standards were enhanced in an ECN (engineering change notice) to the PCIe base specification 1.0a dated 12 Jan. 2004, and also included in the 1.1 and 2.0 PCIe Base Specification releases, to include the concept of device PLL (or other device internal clock circuit) power down via a CLKREQ# (clock request) protocol coupled with L1. Incurring long latencies on the existing L1 mode with PLL power down can result in host processor stalls, thereby resulting in I/O starvation or host processor performance issues.

In some embodiments, intelligent methods of managing link state usage are provided. In some embodiments, variations of lower power states may be supported in the link policy. For example, variations of L1 states with and without device internal clock circuit power down (depending on device traffic patterns for a device at any given moment) may be provided. In some embodiments, link state power levels are utilized to reduce the latency of low power link state exits in order to avoid host processor stalls.

Many conventional peripheral devices move traffic in the computer system on their own schedules through a concept known as bus mastering. For PCIe based peripherals, the generation of bus master traffic is handled independently from any activity that may be occurring naturally in the system. In operation, at the moment traffic is flowing from a device, the whole system must be progressively driven out of the deep idle states.

FIGS. 1A and 1B illustrate the transition of a system to higher powered states as data is transferred. The following processes are illustrated in FIG. 1A and described in FIG. 1B 150, in which it is assumed that a system platform begins in an idle state:

(1) In a system 100, a device 102 is coupled to an I/O controller 106 via a bus, which may be, for example, a PCIe or USB link 104. Device 102 may be, for example, peripheral device of a computer. In this example, the device 102 brings the link 104 out of a low power state for purposes of issuing a transaction, which may be a read or write transaction.

(2) The transaction request brings a chipset interface 108 (DMI—Direct Media Interface) out of a low power state.

(3) A graphics memory controller 110 then exits a low power state in order to service the incoming request from the chipset interface 108.

(4) The graphics memory controller 110 takes action to bring a front side bus (FSB) 112 out of low power state, and acts to snoop transactions.

(5) A processor 114 coupled with the front side bus 112 exits a low power state to service the snoop transactions.

(6) The graphics memory controller 110 is coupled with memory elements 118a-118n via connections 116a-116n (DDR—Double Data Rate operation), and the graphics memory controller 110 brings the memory out of self-refresh mode and issues memory transactions.

(7) The relevant data or transaction completions then flow back to the device 102.

(8) The system platform then returns to an idle state, which involves each relevant element transitioning to a lower power state.

Figure 2:
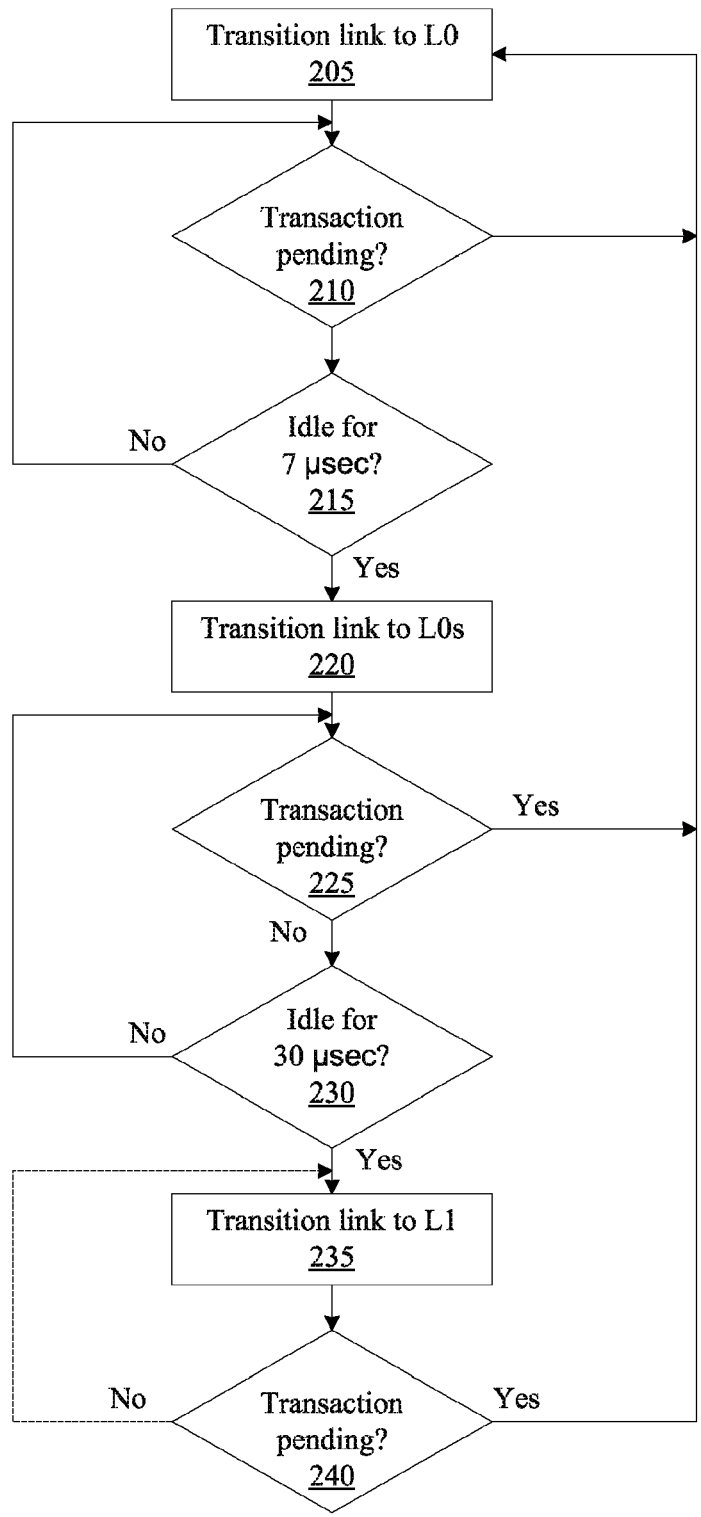
FIG. 2 is a flowchart to illustrate a timeout based link power management policy.

As is apparent from FIGS. 1 and 2, numerous transitions are required to transition a platform from an idle, lower power state to an active state. It can be seen from FIGS. 1 and 2 that the latency seen by the device for its transaction to reach memory may be significant, and may be much larger than the PCI-e link exit latency. The tolerable exit latency specified by the device in its configuration registers is only taken into account for the link exit latency, not for the transaction to memory completion.

A link policy engine, implemented in hardware or software, or a combination of hardware or software, may commonly use a timeout based policy as observed by real-world data collection on devices implementing L1. A timeout based link power management policy may be as shown in FIG. 2. In FIG. 2, a link begins in active state L0 or transitions to this state 205. If there is a transaction pending 210, the link will remain in L0 205. If not, then there is a determination whether the link has been idle for a particular time period, which may be a period of 7 μs as illustrated or another time period. If not, the link remains in L0 205. If 7 μs have elapsed, the link transitions to standby state L0s 220. In L0s, there is a determination whether a transaction is pending 225. If so, the link will transition from standby L0s back to active state L0 205. If not, there is a determination whether the link has been idle for a certain time period, such as 30 μs 230. If not, the link remains in L0s. If so, then the link transitions to power state L1 235, a deeper low power state. If a transaction is pending, then the link transitions back to active state L0. However, a greater amount of time will be required to bring the link to L0 from L1 than would be required had the link been in state L0s. (If there are no transactions pending, the link is shown to remain in state L1, but the link may transition to other lower power states for buses other than PCIe, which does not allow for link states lower than L1 when the device is in D0 state.)

While FIG. 2 illustrates a simple power management policy, such policy is not sufficiently robust in situations where the system response times are slow (i.e. the platform is in a deep low power state), in which case the link may be brought from L1→L0, followed by initiation of the transaction, and by the time the transaction has completed the link policy may have brought the link back again to L1. This may result in data overrun or underrun and device failure, and is especially prevalent and problematic in scenarios where the PCIe transactions are bursty in nature, with device send/receive data rates being much lower than PCIe data rates. In some implementations, the timeout value may be set to a large value (for example, in the range of 3 to 5 msec) to avoid the repeated transitions from L0 to L0s to L1, and then returning from L1 to L0. However, if this is done, then the link is unnecessarily kept in a high power state when it could have appropriately transitioned into a lower power state. In some embodiments, the process of transition from L0 is transformed from a measurement of idle time 230 to an intelligent process that recognizes device activity.

In some embodiments, the policy illustrated in FIG. 2 may be enhanced whereby the link PM (power management) engine (which may be owned by the device, and may be implemented in hardware, software, or a combination of hardware and software) is cognizant of the device traffic patterns that are in flight at any given moment. It is possible that data is being buffered at the device at a continuous rate, but, because of the high peak bandwidth of the PCIe bus, this only requires a small duty cycle on the PCIe link. In such a case, in order to avoid link state thrash, the link policy engine may be augmented with deeper device knowledge such that, for example, it does not transition the link any deeper than L0s while between bursts of a longer buffered device transaction if the duration between the bursts is small.

In some embodiments, the power management engine provides link power policy management that may include:

1) Use of two variations of L1: L1 with device PLL (phase lock loop) (or other device internal clock circuit) power down (via assertion or de-assertion of a clock request (CLKREQ#)) and "traditional" L1 without powering down the PLL. The decision to use the deep power state may be based on the latency tolerance of the device and the frequency of accesses from the host in the current conditions. Recent transaction history and device connection state may be taken into account as well, according to some embodiments.

2) Link policy that is based on current device state, versus blindly entering link states if a transaction request has not been processed within some period of time.

3) Proper buffering to deal with device latencies that may be observed in deeply power managed mobile platforms.

In some embodiments, the link power management engine may begin by monitoring a link of a device for a transaction. When a transaction is pending, the engine may transition the link to an active state. If there is no transaction pending and the device is idle for some duration of time, such as, but not limited to, about 7 μs, the engine may then transition the link to a standby state. Or if there is no transaction pending and the device is not anticipating actively sending or receiving information over the bus, then the engine may determine whether the link can be transitioned into a standby, idle, or deep idle state. In some embodiments, to support intelligent link management, a link power management engine stores information about at least one of the following: the link state, the device buffering, the controller or device state, or a history of transactions.

If the device can be transitioned into the deep idle state, then the engine may transition the link into the deep idle state by at least shutting down a device PLL or other internal clock circuit. However, if the device should not be transitioned into the deep idle state, then the engine may transition the link into the idle state. When there is a transaction pending, the engine may transition the link from the idle or deep idle state to the active state. In some embodiments, the engine may transition the link to an active state from any of the other link states. In some embodiments, the device may be transitioned directly from an idle state to a deep idle state and back. In some embodiments, the device PLL may be shut down at least in part by a signal that directs the device to reference a clock source.

Figure 3:
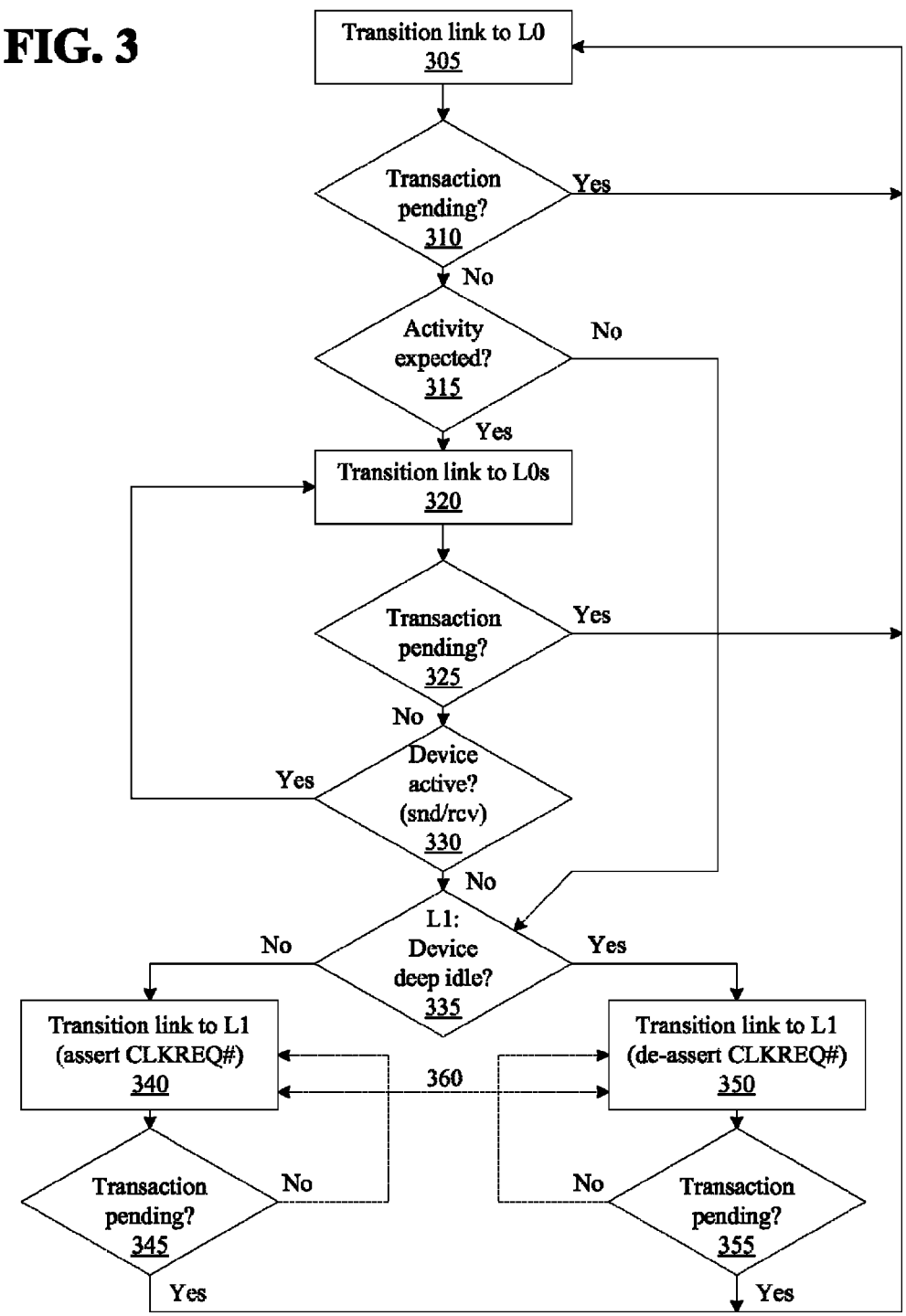
FIG. 3 is a flowchart to illustrate an embodiment of an intelligent link power management process.

FIG. 3 is a flowchart to illustrate an embodiment of an intelligent link power process. In this illustration, a link currently is in active state L0 or transitions to this state 305. If there is a transaction pending 310, the link will remain in L0 305. If not, the device transitions to a lower power state. In some embodiments, the device may be transitioned from the active state to a standby state, or may be transitioned directly from that active state to an idle or deep idle state without going through the standby state. For example, if no activity is expected soon 315, the link may transition directly to idle L1 335. If activity may occur soon, the link may transition to standby state L0s 320, which may occur immediately or after a wait of a certain time period. A time period may be, for example, a time period of no more than 7 µs. In other embodiments different time periods may be used, as one skilled in the art would appreciate based at least in part on the teachings described herein. In L0s, there is a determination whether a transaction is pending 325. If so, the link will transition from L0s back to active state L0 305. In some embodiments, if there is not a transaction pending, there is a determination whether the device is anticipating sending or receiving operations 330. In some embodiments, the knowledge of the device with regarding to ongoing operations is used in the determination of activity. For example, if a device has transferred data and is awaiting a reply, this activity of the device is utilized in the determination of the link power state. Device knowledge of periodicity of data may also be utilized for determining link power state. If the device is anticipating activity, the link remains in standby state L0s 320. If the device is not active, then the link transitions to power state L1 335. In some embodiments, a determination may be made whether a deep idle state is appropriate for the device. In some embodiments, the determination may be made based at least in part on knowledge of the device of expected operation. If a deep idle state is appropriate, there is a transition to L1 with de-assertion of CLKREQ# 350, and thus allowing turning off the device PLL or other internal clock circuit. If a deep idle state is not appropriate, there is a transition to L1 with assertion of CLKREQ# 340. With either state, if there is a transaction pending 345 or 355 then the link transitions back to L0 305. (If there are no transactions pending, the link is shown to remain in state L1, but the link may transition to other lower power states for buses other than PCIe, which does not allow for link states lower than L1 when the device is in D0 state.) In some embodiments, there may be transitions between the L1 states 340 and 350 as appropriate 360.

Figure 4:
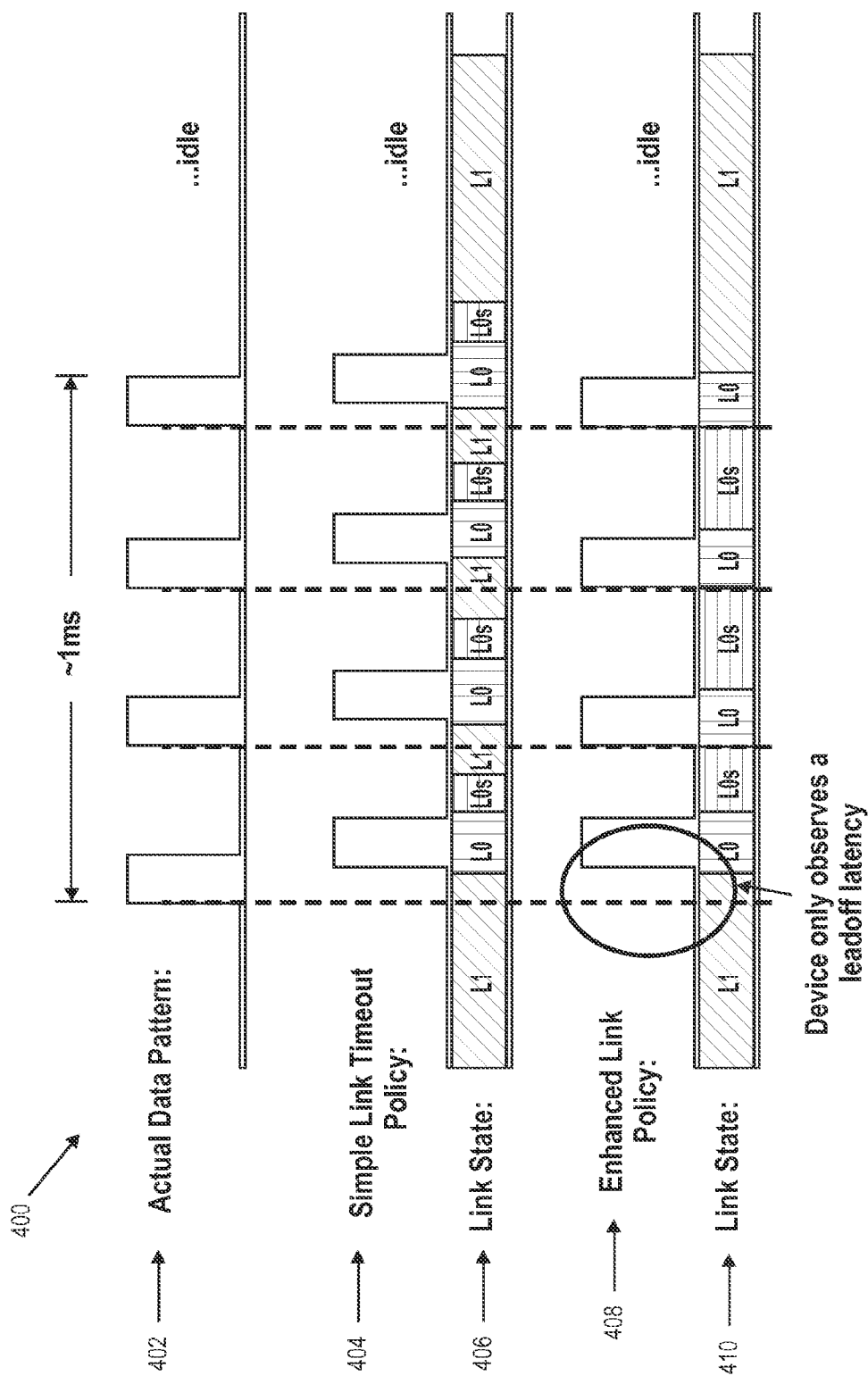
FIG. 4 is a timing diagram illustrating link power state latency management according to some embodiments.

FIG. 4 is a timing diagram 400 illustrating link power state latency management according to some embodiments. In this illustration, the actual data pattern 402 includes a series of transactions with period of inactivity between such transactions, which may include data latency in the system. (The illustration shows regularly spaced transactions for simplicity, but embodiments are not restricted to any particular data pattern.) In this illustration, a simple link timeout policy 404 is shown, which may represent the policy provided in FIG. 2. The link begins in L1 state 406, and transitions to L0 when the data transfer is requested. After completion of the transfer, the link will quickly transition to L0s (which may be after a certain period, such as 7 µs of idle time). However, because of data latency, the link times out (after a defined period of idle time) and transitions to L1. However, the transition back from L1 to L0 is relatively slow and thus there may be a latency in each data transfer and significant link state thrashing.

In contrast, an enhanced link policy 408 provides for improved performance. The enhanced policy may represent the policy provided in FIG. 3. Under this policy, the link state 410 begins in L1 and there is a leadoff latency for transition to L0 in the first data transfer instance. At this point the device is generally aware of its data activity. After the data transfer, the link transitions to L0s (after 7 µs of idle time). However, the link does not transition to L1 when the device is active, remaining instead in standby state L0s. Thus, the transitions to L0 occur more quickly, reducing latency in each subsequent transfer. The system then transitions to L1 when the device is no longer active.

Figure 5:
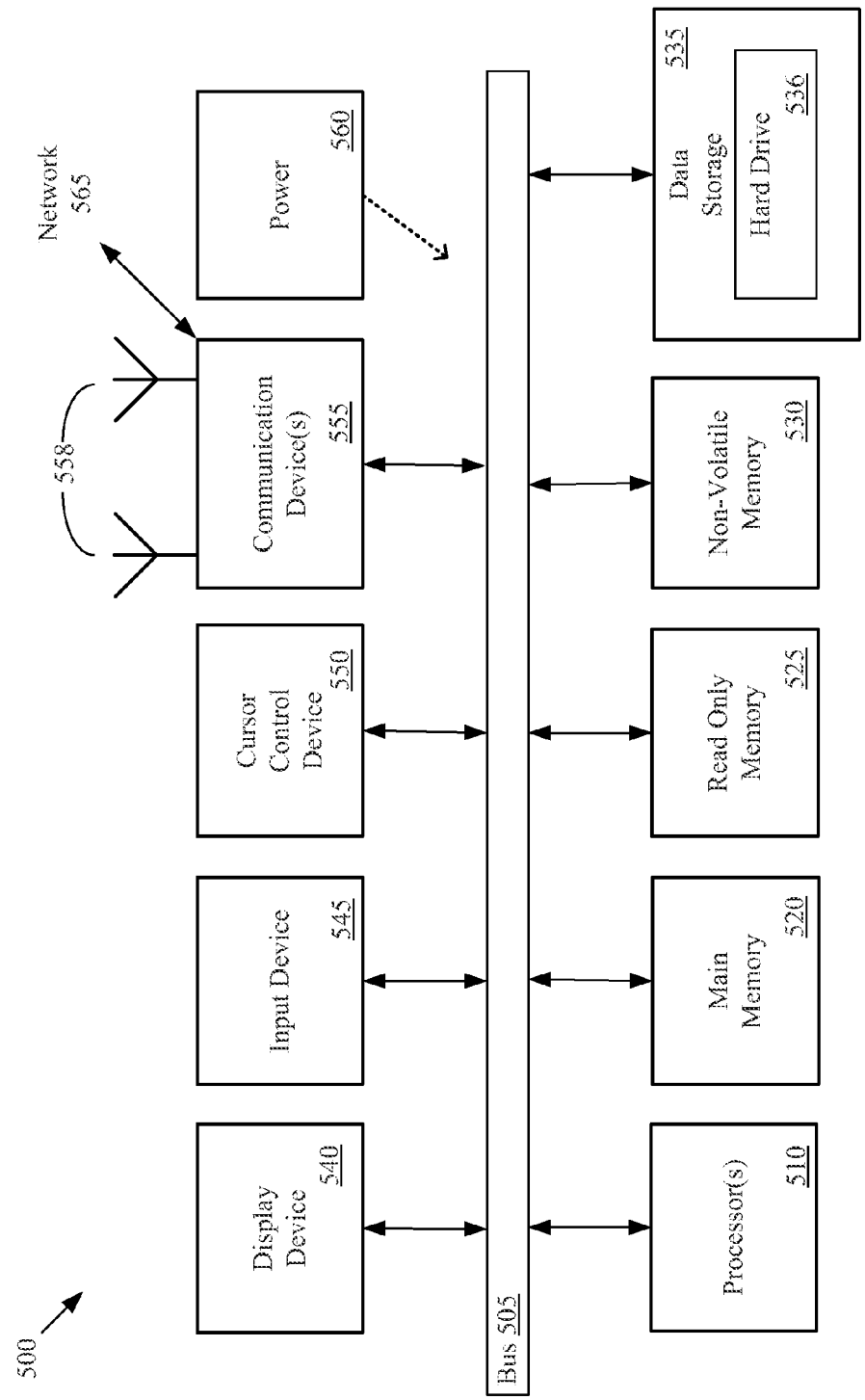
FIG. 5 is an illustration of a computer system that may include an embodiment of link power management.

FIG. 5 is an illustration of a computer system that may include an embodiment of link power management. In this illustration, certain standard and well-known components that are not germane to the present description are not shown. Under some embodiments, a computer 500 comprises a bus 505 or other communication means for communicating information, and a processing means such as one or more processors 510 coupled with the bus 505 for processing information. The processors 510 may comprise one or more physical processors and one or more logical processors. Further, each of the processors 510 may include multiple processor cores. The computer 500 is illustrated with a single bus 505 for simplicity, but the computer may have multiple different buses and the component connections to such buses may vary. The bus 505 shown in FIG. 5 is an abstraction that represents any one or more separate physical buses, point-to-point connections, or both connected by appropriate bridges, adapters, or controllers. The bus 505 may include, for example, a system bus, a PCI or PCIe bus, a HyperTransport or industry standard architecture (ISA) bus, a small computer system interface (SCSI) bus, a USB or USB2, IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements) In some embodiments, the computer 500 may support power management, including power management for link states.

In some embodiments, the processors 510 may be utilized to support one or more virtual machines. In some embodiments, the computer 500 further comprises a random access memory (RAM) or other dynamic storage device as a main memory 520 for storing information and instructions to be executed by the processors 510. Main memory 520 also may be used for storing temporary variables or other intermediate information during execution of instructions by the processors 510. In some embodiments, the main memory 520 is used to store a link power management engine. In some embodiments, to support intelligent link management, the link power management engine stores information about at least one of the following: the link state, buffering, the controller or device state, or a history of transactions. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may include a shared memory, such as a shared BIOS/OS memory, that is accessible by multiple agents in the computer system. The computer 500 also may comprise a read only memory (ROM) 525 or other static storage device for storing static information and instructions for the processors 510. The computer 500 may include one or more non-volatile memory devices 530 for the storage of certain elements, including, but not limited to, system BIOS and one or more pre-OS applications.

Data storage 535 may also be coupled to the bus 505 of the computer 500 for storing information and instructions. The data storage 535 may include a magnetic disk, an optical disc and its corresponding drive, or other memory device. Such elements may be combined together or may be separate components, and utilize parts of other elements of the computer 500. In a particular embodiment, the data storage 535 may include a hard drive 536.

The computer 500 may also be coupled via the bus 505 to a display device 540, such as a cathode ray tube (CRT) display, a liquid crystal display (LCD), a plasma display, or any other display technology, for displaying information to an end user. In some embodiments, the display device may be utilized to display television programming. In some environments, the display device 540 may include a touch-screen that is also utilized as at least a part of an input device. In some environments, the display device 540 may be or may include an audio device, such as a speaker for providing audio information, including the audio portion of a television program. An input device 545 may be coupled to the bus 505 for communicating information and/or command selections to the processors 510. In various implementations, input device 545 may be a keyboard, a keypad, a touch-screen and stylus, a voice-activated system, or other input device, or combinations of such devices. Another type of user input device that may be included is a cursor control device 550, such as a mouse, a trackball, or cursor direction keys for communicating direction information and command selections to the one or more processors 510 and for controlling cursor movement on the display device 540.

One or more communication devices 555 may also be coupled to the bus 505. Depending upon the particular implementation, the communication device 555 may include a transceiver, a wireless modem, a network interface card, LAN (Local Area Network) on motherboard, or other interface device. The uses of a communication device 555 may include reception of signals from wireless devices. For radio communications, the communication device 555 may include one or more antennas 558, including any dipole or monopole antennas, as required. In one embodiment, the communication device 555 may include a firewall to protect the computer 500 from improper access. The computer 500 may also be linked to a network, such as network 565, or to other devices using the communication devices 555, which may include links to the Internet, a local area network, or another environment. The computer 500 may also comprise a power device or system 560, which may comprise a power supply, a battery, a solar cell, a fuel cell, or other system or device for providing or generating power. The power provided by the power device or system 560 may be distributed as required to elements of the computer 500. In some embodiments, the power distribution may be affected by power management, including the power management of link states.

Figure 6:
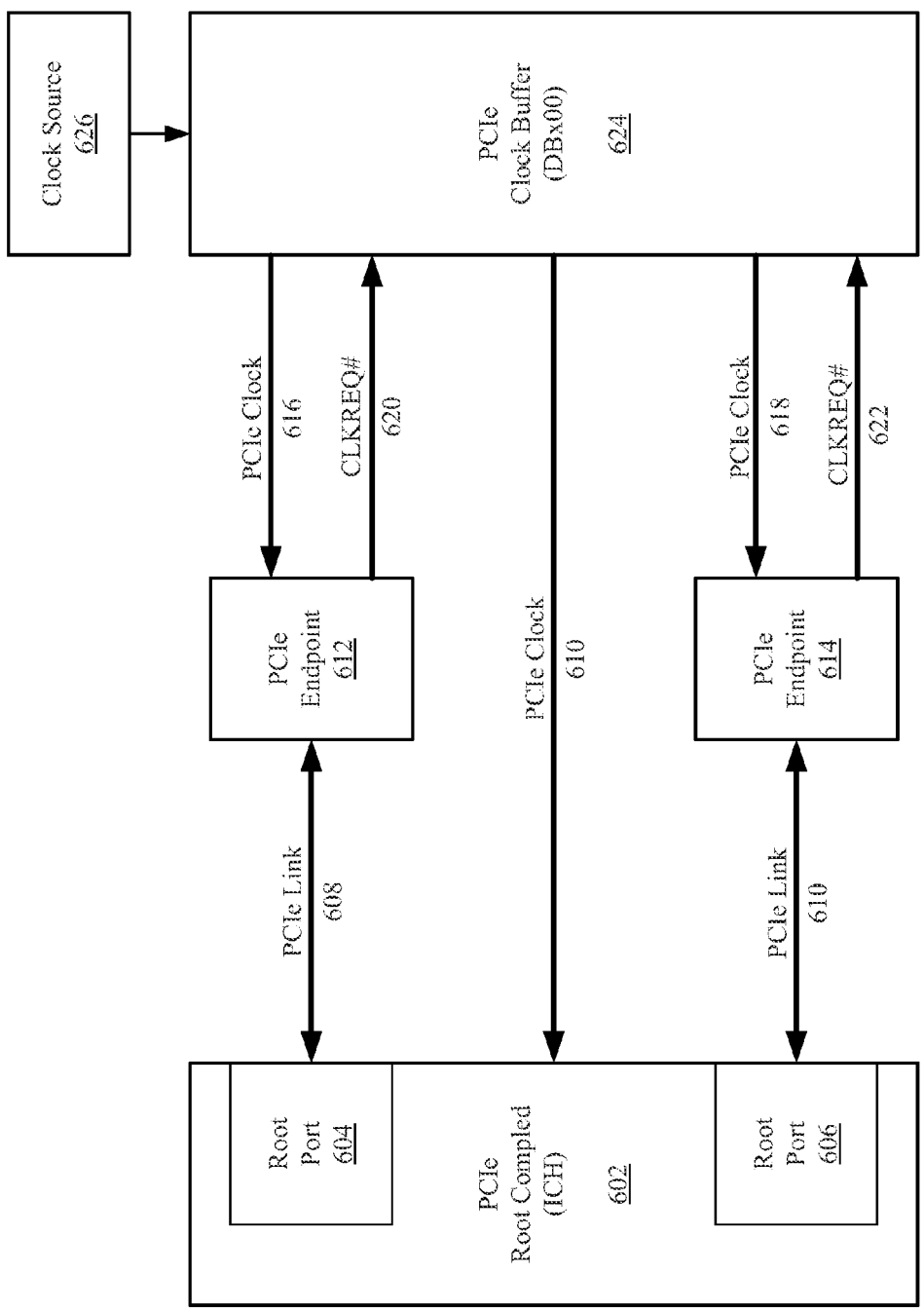
FIG. 6 illustrates an implementation of a deep idle state that may be utilized in some embodiments.

FIG. 6 illustrates an implementation of a deep idle state that may be utilized in some embodiments. In this illustration, a PCIe root complex (ICH—Input/Output Controller Hub 602) includes multiple root ports 604-606 that connect via PCIe links 608-610 to PCIe endpoints 612-614. Each PCIe endpoint 612-614 receives a PCIe clock signal 616-618 from a PCIe clock buffer 624, and a clock signal 610 is also received by the ICH 602. The PCIe clock buffer 624 receives a clock signal from a clock source 626. In this illustration, each PCIe endpoint 612-614 may provide a clock request signal CLKREQ# 620-622. If the clock request is de-asserted, the internal clock circuit for the device may be shut down, allowing for a deeper idle state.

Those skilled in the art having the benefit of this disclosure will appreciate that many other variations from the foregoing description and drawings may be made within the scope of the invention. Indeed, the invention is not limited to the details described above. Rather, it is the following claims including any amendments thereto that define the scope of the invention.

In the description above, for the purposes of explanation, numerous specific details are set forth in order to provide a thorough understanding of the invention. It will be apparent, however, to one skilled in the art that the invention may be practiced without some of these specific details. In other instances, well-known structures and devices are shown in block diagram form.

Embodiments of the invention may include various processes. The processes of the invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the invention may be provided as a computer program product, which may include a machine-readable medium having stored thereon instructions, which may be used to program a computer (or other electronic devices) to perform a process according to the invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, embodiments of the invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but processes can be added to or deleted from any of the methods and information can be added or subtracted from any of the described messages without departing from the basic scope of the invention. It will be apparent to those skilled in the art that further modifications and adaptations can be made. The particular embodiments are not provided to limit the invention but to illustrate it. The scope of the invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
   transitioning a link of an electronic device from an active power state to an idle power state, where transitioning the link includes transitioning to the idle power state upon a determination that there is no transaction pending for the electronic device and that transaction activity on the link is not anticipated for the device;
   wherein the transitioning of the link from the active power state to the idle power state includes transition to one of a first idle state or a second deep idle state based on a determination whether the second deep idle state is appropriate for the electronic device.

2. A method of claim 1, wherein the determination that there is no activity anticipated for the electronic device is based on a link power management engine's knowledge regarding data activity of the device.

3. The method of claim 1, wherein the determination of the appropriateness of a transition of the link into the second deep idle state is based on latency tolerance of the electronic device and frequency of accesses from a host to the electronic device in current conditions.

4. The method of claim 3, wherein the electronic device includes an internal clock, and wherein the transition of the link into the deep idle state includes shutting down the internal clock circuit of the electronic device.

5. The method of claim 4, wherein if the link cannot be transitioned into the second deep idle state, then transition of the link into an idle state comprises transitioning the link into the first idle state.

6. The method of claim 4, wherein the internal clock circuit is shut down at least in part by a signal that directs the electronic device to reference a clock source.

7. An apparatus comprising:
   a device coupled to a controller via a link;
   a link power management engine to alter a link state based on a transaction between the device and the; and
   a memory or logic to hold the link power management engine;
   wherein altering the link state by the link power management engine includes:
     transitioning the link state from the active power state to an idle power state based upon a determination that there is no transaction pending for the device and that transaction activity on the link is not anticipated for the device;
   wherein transitioning the link state from the active power state to the idle power state includes transition to one of a first idle state or a second deep idle state based on a determination by the link power management engine whether the second deep idle state is appropriate for the device.

8. The apparatus of claim 7, wherein the memory is also to store information about at least one of the following: the link state, buffering, the controller or device state, or a history of transactions.

9. The apparatus of claim 7, wherein the transaction includes information being exchanged between the device and the controller.

10. The apparatus of claim 7, wherein the device is a peripheral of a computer system.

11. The apparatus of claim 7, wherein the controller is part of an input/output (I/O) controller of a computer system.

12. The apparatus of claim 7, wherein at least some of logic of the link power management engine is implemented in hardware or software.

13. The apparatus of claim 7, wherein the determination of the appropriateness of a transition of the link into the second deep idle state is based on latency tolerance of the device and frequency of accesses from a host to the device in current conditions.

14. The apparatus of claim 13, wherein the device further includes an internal clock circuit, and wherein the transition of the link into the deep idle state includes shutting down the internal clock circuit of the device.

15. A system comprising:
   a bus;
   a controller coupled to the bus;
   a device coupled to the bus, the device having a link to the controller over the bus; and
   a link power management engine to manage the link, the engine to alter a link state based on the transactions and knowledge of upcoming transactions between the device and the controller, wherein altering the link state by the link power management engine includes:
     transitioning the link state from the active power state to an idle power state upon a determination that there is no transaction pending for the device and that transaction activity on the link is not anticipated for the device;
   wherein transitioning the link state from the active power state to the idle power state includes transition to one of a first idle state or a second deep idle state based on a determination whether the second deep idle state is appropriate for the device.

16. The system of claim 15, wherein the determination of the appropriateness of a transition of the link into the second deep idle state is based on latency tolerance of the device and frequency of accesses from a host to the device in current conditions.

17. The system of claim 16, wherein the device further includes an internal clock circuit, and wherein the transition of the link into the deep idle state includes shutting down the internal clock circuit of the device.

* * * * *